E. W. CUNNINGHAM.
PULLEY.
APPLICATION FILED JAN. 19, 1905. RENEWED FEB. 18, 1907.

904,685.

Patented Nov. 24, 1908.

2 SHEETS—SHEET 1.

Witnesses
Ivan Konigsberg
George W. Moseley

Inventor
Edgar W. Cunningham
By his Attorney

E. W. CUNNINGHAM.
PULLEY.
APPLICATION FILED JAN. 19, 1905. RENEWED FEB. 18, 1907.
904,685.
Patented Nov. 24, 1908.
2 SHEETS—SHEET 2.
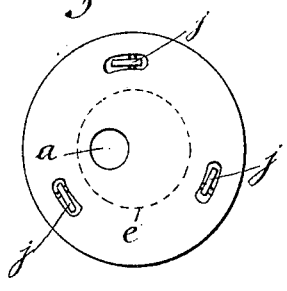
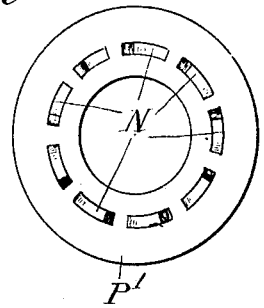
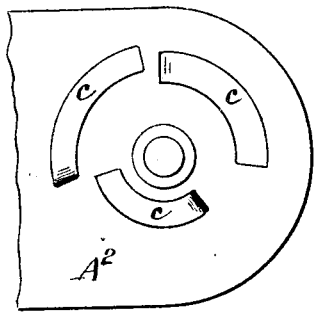
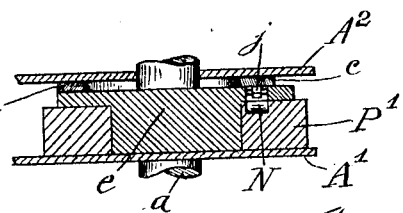
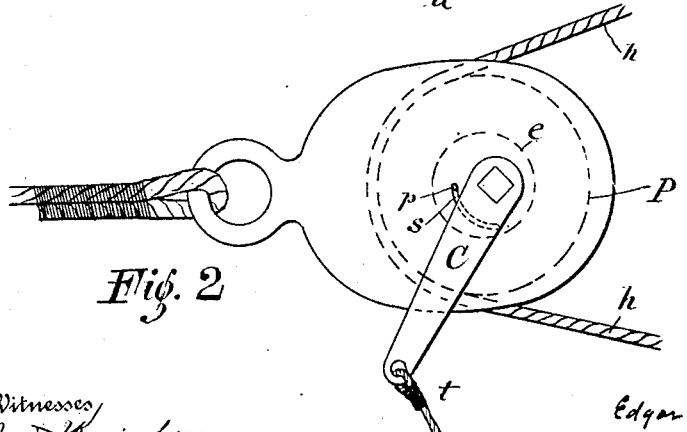

UNITED STATES PATENT OFFICE.

EDGAR W. CUNNINGHAM, OF ROSELLE, NEW JERSEY.

PULLEY.

No. 904,685.   Specification of Letters Patent.   Patented Nov. 24, 1908.

Application filed January 19, 1905, Serial No. 241,892.   Renewed February 18, 1907.   Serial No. 358,112.

*To all whom it may concern:*

Be it known that I, EDGAR W. CUNNINGHAM, a citizen of the United States of America, residing at Roselle, Union county, New Jersey, have invented certain new and useful Improvements in Pulleys, of which the following is a specification, reference being had to the accompanying drawings, forming part of the same.

Figure 1:
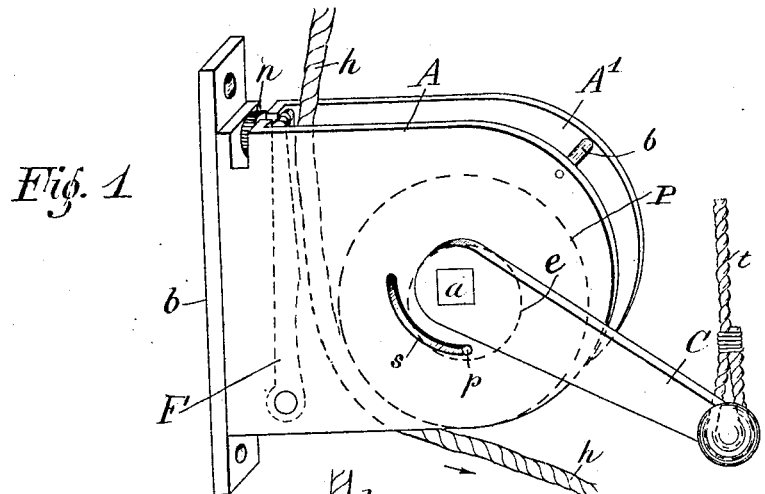
Figure 4:
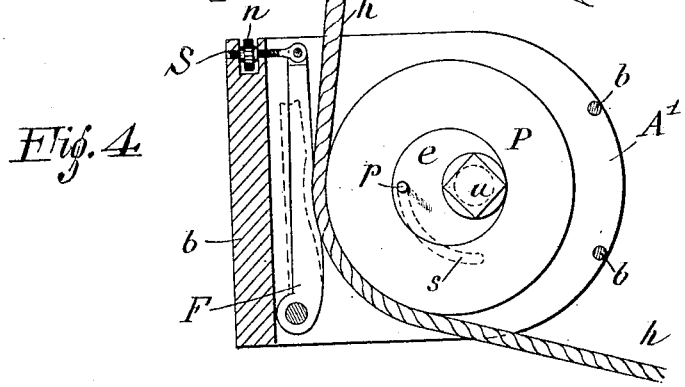
Figure 9:
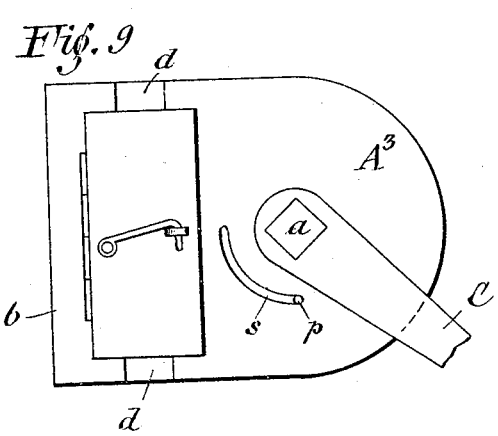
Figure 3:
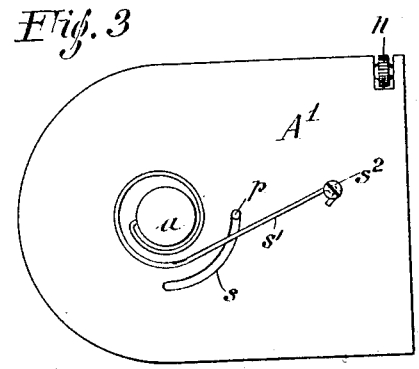

Figure 1, is a view, in perspective, of a leading pulley embodying my invention. Fig. 2, is a side elevation of a block pulley also embodying said invention. Fig. 3, is a plan view of the reverse side of the pulley of Fig. 1, showing the spring employed to return the eccentric to engaging position. Fig. 4, is a plan view of the device of Fig. 1, from which the cheek of the shell has been removed. Fig. 5, is a plan view of the pulley wheel of a modified form sometimes used. Fig. 6, is a plan view of the axle of such modified form. Fig. 7, is an interior face view of the shell of such modified form. Fig. 8, is a side view, partly in section, of the device of Figs. 5, 6 and 7, assembled for use. Fig. 9, shows the device in snatch block form.

My invention relates to pulleys and consists, broadly stated, in a pulley which will run freely in one direction but will automatically grip and hold a halyard, sheet or other rope when reversely turned. Further, in devices by which such pulley may be readily set to run freely in said reverse direction, and in various other features more particularly set forth hereafter and in the claims.

Fig. 1, shows the pulley shell, consisting of cheeks A, A¹, here secured together and provided with a plate for mounting the pulley in a fixed position.

*a*, is the pin or fixed axle of the pulley; that is to say, it may rotate but need not otherwise change its position. It is mounted in the shell (composed of the cheeks A, A¹ and the stays or blocks *b*), and may carry a crank arm C. Within the shell, said axle carries, or is enlarged into, a drum *e*, eccentrically placed with reference to the axis of shaft *a*, and upon this drum I mount the pulley proper or sheave P, an annular wheel, preferably a true circle both at its periphery and its interior face, fitting closely upon the drum *e*. Its periphery may be slightly scored or roughened to create a better holding surface.

F, is an adjustable friction piece or shoe hinged to the shell and provided with a set screw S and adjusting nut *n*, by which it may be made to approach to or recede from the face of sheave P. It may be omitted and the shell may constitute the friction piece. As is manifest, if the halyard *h*, be hauled to the right as indicated by the arrow, the sheave will turn in that direction, drum *e*, will be similarly turned because of the friction between it and the sheave and the halyard may run free. I name that rope because such a pulley is particularly useful on shipboard to lead the sail ropes to an engine or other hoisting power and that side of the pulley from which the rope leads to the hoisting power, I denominate the power side of the pulley. In the illustrated devices the lower sides would answer that description. It is equally manifest, that if the power be relaxed and the halyard start upward, that pulley P will reverse, as will drum *e*, and as the long side of its eccentricity turns toward the shoe F, or the shell, if there be no friction piece, the halyard will be pinched between the face of the sheave and the shoe or shell and firmly held. The end may then be cast loose from the engine, or released by the crew who may give their attention to another, leaving *h*, to be held by the leading pulley or block, itself.

When it is desired to release the rope, that may readily be done by seizing the trip line *t*, secured to crank arm C and swinging that to the right just as it would be operated by the first named movement of rope *h*, so that one man, with *h*, in one hand and the trip line *t*, in the other, can by judicious snubbing, control the lowering of a much heavier sail than would otherwise be possible. Such snubbing is done by slackening the trip line *t*, which permits the eccentric to turn back so as to cause the rope to bear against the friction piece F, enough to check it but not enough to prevent all movement. If it should tighten too much, the trip line (as here shown) is drawn more to the right. If the rope runs too free, the trip line is slackened again or more. This action is rendered possible by the peculiar location and arrangement of the lever C. It will be noticed that it extends from that side of the drum like axle having the greater eccentricity; that is to say, if a line be drawn diametrically through the axis of the said axle to its extremities of greatest and least eccentricity and another be also drawn through said axis but at right angles to the first, the last line will divide the axle into a division including the great eccentricity and one including the less, and when I say the side having the greater eccentricity, I mean that side bounded by the curve of the greater eccentricity and the said latter divisional line. Other location than on that side, would render the lever inoperative for releasing purposes. Then too as will be seen, the lever is on the power side of the pulley, that is, the side upon which the power is applied by hand or engine to draw the rope through it to hoist the sail or other weight, it being itself the fulcrum.

In order to control the play of the eccentric I have cut a slot $s$, in the cheek and set a guide and stop pin $p$, in the drum $e$, the slot being preferably cut as an arc with the axis of $a$, for its axis and 90 degrees for its limit, its inner extremity being at that point nearest to the shoe. To insure the automatic return of the eccentric to its binding position, the instant the opposite strain is released, I prefer to employ a spring $s^1$, fastened to axle $a$, and bearing against stop $s^2$, or some other stop independent of the pulley wheel.

In order that the bight of the line may be readily placed in this variety of pulley, I sometimes construct them in snatch block form, that is, with a division in one cheek of the shell, as at $d$, to be closed by a hasp, staple and hook. I have also made provision for locking the pulley wheel to the eccentric, as a further insurance of the effective holding power of the device. In doing this, it is to be remembered that the wheel should always run free in the arrow direction and sometimes (when a line is to be slackened) in the reverse direction, and the locking devices must accommodate themselves to these requirements; but it is also true that the locking may always take effect when the long diameter of the eccentric points to the nearest part of the shoe. I have devised several ways of accomplishing this result, but for many reasons I prefer the one shown in Figs. 5–8. In constructing it, I cut a series of niches N, with an inclined base wall and an end wall, preferably somewhat abrupt but not quite vertical, in one side face of the pulley wheel $P^1$. They may be and usually are evenly spaced, and while one would answer, such a number as will leave little unoccupied space gives a more speedy action. Then I project a support from the edge of the eccentric drum $e$, preferably in the form of a flange, out over said niched face of the pulley wheel, and in such extension I mount a series of pawls $j$, pivoted to swing and weighted so as to normally stand with their engaging teeth projected toward the niched face of the pulley wheel. As in case of the niches, one pawl would answer but I prefer to employ three, that a change in position of the pulley may not put them all out of action, and I prefer to make their teeth of such form that their engaging faces will not stand vertical when engaged, as hereafter set forth. Then on the inner face of the shell adjacent to the drum $e$, and in the path of the outer ends of the pawls, I construct a series of cam projections $c$, equal in number to the pawls, inclined at their ends (or at one end) and, for the greater part of their lengths, projecting so closely to the side face of the drum that they will hold the teeth of the pawls away from the face of the pulley wheel. I have used three, as by dividing the circle of movement into three parts, I get cams of sufficient length to control the pawls during the substantially quarter circle movement to which the drum is usually limited, but this too is a matter to be arranged and proportioned according to the form and movement of the drum and the particular use for which the pulley is intended. The action is plain.

When the drum is set with its greatest axial radius on a line projected from that, measuring the shortest distance from the shoe, the outer ends of the pawls lie in the spaces between the cams and the teeth will lie against the side face of the pulley wheel. They will either lie in the niches N, or so near them that a slight movement of the sheave on the drum will cause the pawl teeth to engage the abrupt end walls of the niches, and the drum and sheave will thus be locked together, from independent movement in one direction and become thereby a solid cam to crowd the rope against the shoe and hold it firmly in position. But when it is desired to release the rope and the drum is turned back by means of the crank, to effect that purpose, the outer ends of the pawls will be brought against the cams $c$, and will be forced inward, thereby forcing the tooth ends outward and unlocking the drum from the sheave, which may thereafter turn freely. As soon as the stress on the crank is relieved, the spring $s^1$, or, if that be absent, the friction between sheave and drum, particularly if any line strain be present, will swing the drum back to the first position, the pawls will clear the cams and again drop to an engaging position.

I prefer to avoid the use of a spring at each pawl, to control the swinging of it on its pivot, but that is not excluded from the scope of my invention, and many other changes in the details of the device will readily suggest themselves as possible to any one of mechanical knowledge. The illustration of them all would be beyond the limit of an ordinary specification, though all might be and many certainly are within its scope. Then too, though I have mentioned "leading pulleys", I by no means limit my claim to such as are strictly "leading pulleys". Its use in many other positions than that of a "leading pulley", will be at once appreciated.

What I claim as my invention and desire to secure by Letters Patent is:—

1. In a pulley, the combination of an annular pulley wheel, mounted upon a drum like axle, which in turn is also provided with an axle set eccentrically to the interior face of the pulley wheel, a bearing piece set opposite the face of the pulley wheel, a support for said drum like axle, and a releasing lever, secured to the drum like axle and projecting from that side of it having the greater eccentricity, all substantially as set forth.

2. In a pulley, the combination of an eccentrically set wheel, a pin, a supporting shell, and an adjustable bearing piece, set opposite the face of the sheave, all substantially as set forth.

3. In a pulley, the combination of an annular pulley wheel, mounted upon a drum like axle, which in turn is also provided with an axle set eccentrically to the interior face of the pulley wheel, a bearing piece set opposite the face of the pulley wheel, a support for said drum like axle, and a releasing lever, secured to the drum like axle and projecting from "the power side of the pulley" and that side of the drum like axle having the greater eccentricity, all substantially as set forth.

4. In a pulley, the combination of an annular pulley wheel, mounted upon a drum like axle, which in turn is also provided with an axle set eccentrically to the interior face of the pulley wheel, a bearing piece set opposite the face of the pulley wheel, a support for said drum like axle and a spring with its stress opposed to the turning of the end of the long radius of the drum away from the bearing piece, all substantially as set forth.

5. In a pulley, the combination of an annular pulley wheel, mounted upon a drum like axle, which in turn is also provided with an axle set eccentrically to the interior face of the pulley wheel, a bearing piece set opposite the face of the pulley wheel, a support for said drum like axle, and means substantially as set forth for locking said drum and said pulley wheel together, all substantially as set forth.

6. In a pulley, the combination of an annular pulley wheel, mounted upon a drum like axle, which in turn is also provided with an axle set eccentrically to the interior face of the pulley wheel, a bearing piece set opposite the face of the pulley wheel, a support for said drum like axle, means substantially as set forth for locking said drum and said pulley wheel together, and a crank secured to the axle, all substantially as set forth.

7. In a pulley, the combination of an annular pulley wheel, mounted on a drum like axle, which in turn is also provided with an axle set eccentrically to the interior face of the pulley wheel, a bearing piece set opposite the face of the pulley wheel, a support for said drum like axle, an engaging device upon said drum, a complemental engaging device upon said pulley wheel, arranged as described to engage in but one direction, and means substantially as set forth for disengaging said respective devices, all substantially as set forth.

8. In a pulley, the combination of an annular pulley wheel, mounted upon a drum like axle, which in turn is also provided with an axle set eccentrically to the interior face of the pulley wheel, a bearing piece set opposite the face of the pulley wheel, a support for said drum like axle, an engaging device upon said drum, a complemental engaging device upon said pulley wheel, arranged as described to engage in but one direction, a cam mounted upon the support, in the path of the engaging device, all substantially as set forth.

9. In a pulley, the combination of an annular pulley wheel, mounted upon a drum like axle, which in turn is also provided with an axle set eccentrically to the interior face of the pulley wheel, a bearing piece set opposite the face of the pulley wheel, a support for said drum like axle, an engaging device upon said drum, a complemental engaging device upon said pulley wheel, arranged as described to engage in but one direction, a cam mounted upon the support, in the path of the engaging device, and a crank secured to the axle of said drum, all substantially as set forth.

10. In a pulley, the combination of an annular pulley wheel, mounted on a drum like axle, which in turn is also provided with an axle set eccentrically to the interior face of the pulley wheel, a bearing piece set opposite the face of the pulley wheel, a support for said drum like axle, an engaging device upon said drum, a complemental engaging device upon said pulley wheel, arranged as described to engage in but one direction, a cam mounted upon the support, in the path of the engaging device and extending along said path a greater distance than that of the movement of the engaging device upon said drum, all substantially as set forth.

11. In a pulley, the combination of a shell, an annular sheave, an axle mounted in said shell and supporting said sheave means, substantially as described, for automatically moving said sheave to a new position in said shell and also means, substantially as described, for returning said sheave to its first position.

In testimony whereof, I have signed my name to this specification in the presence of two subscribing witnesses, this ninth day of January 1905.

EDGAR W. CUNNINGHAM.

Witnesses:
A. G. N. VERMILYA,
L. D. CHURCH.